March 10, 1959 — J. F. MAGNESS — 2,877,107
FINES HANDLING PROCESS
Filed Aug. 8, 1957
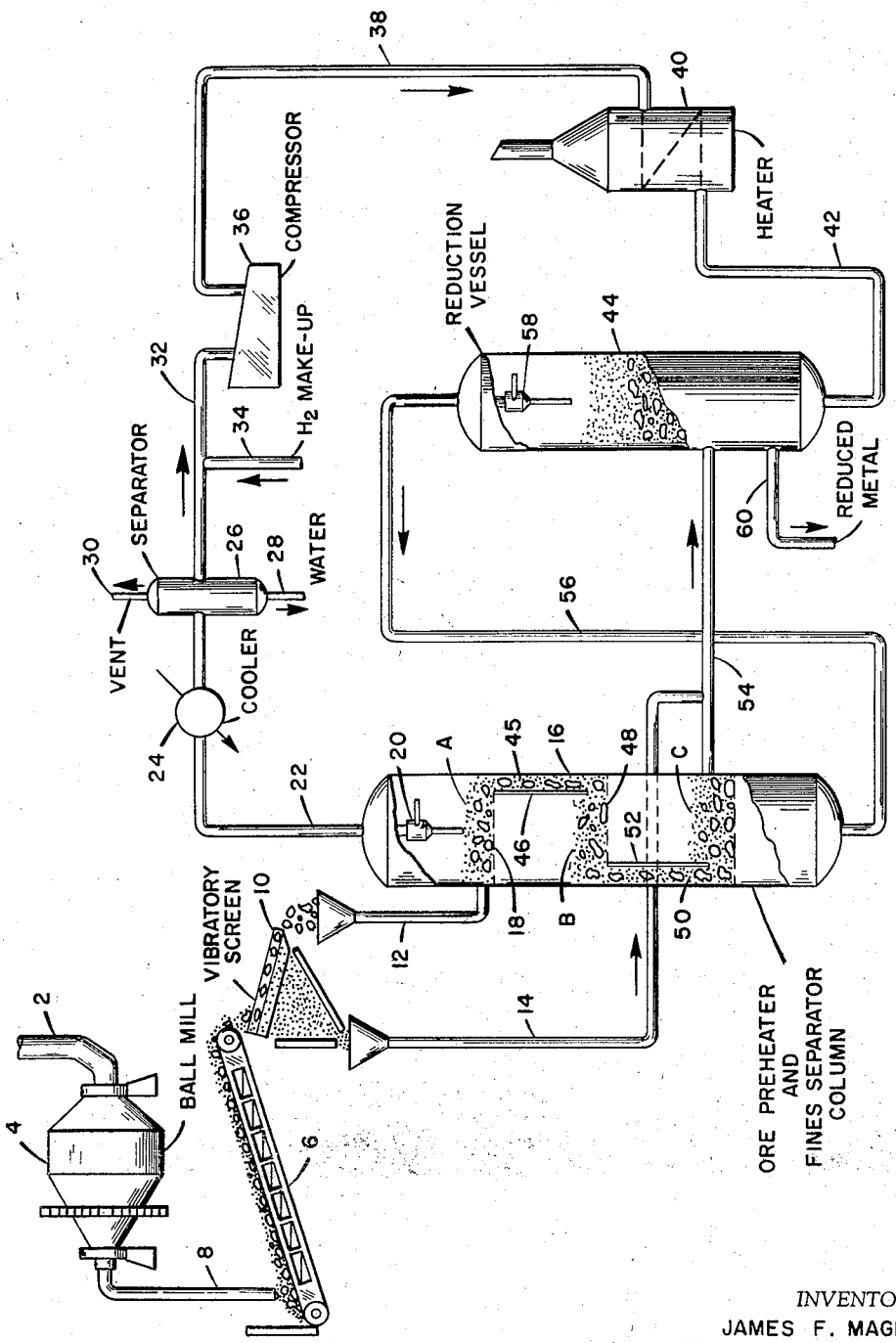
INVENTOR.
JAMES F. MAGNESS
BY
ATTORNEY

2,877,107
FINES HANDLING PROCESS

James F. Magness, Tulsa, Okla., assignor to Pan American Petroleum Corporation, Tulsa, Okla., a corporation of Delaware Application August 8, 1957, Serial No. 676,965

6 Claims. (Cl. 75—35)

This invention relates to a novel method for the handling and retention of fine particles in fluidized systems. One particular aspect of this invention is concerned with the recovery of metals from their ores, such as the oxidic ores of nickel, iron, etc., by reduction with a suitable reducing gas under fluidized conditions.

In previous work relating to the fluidized techniques such as, for example, the reduction of metal oxides, considerable difficulty has been encountered in the loss of fines, i. e., particles passing through a 325 mesh screen, in the effluent gas from the reduction vessel. Such losses can be substantial. For example, certain forms of concentrated taconite analyzing in excess of 60 percent iron, contain as much as 80 to 85 percent material having a particle size of less than 325 mesh. Obviously with ore charges having such a high proportion of fines, fluidized reduction of the ore in such form, by conventional methods, is impractical. One measure taken to correct excessive loss of fines in such operations involves the use of filters. However, this has not met with success since the filters become plugged, causing an intolerable pressure drop in the system and requiring frequent blow-back cycles to clean the filters. Also excessive packing of fine ore and iron particles occurs between the filter elements extending into the fluid bed.

The presence of fines in the ore charge to a reduction vessel employing the fluidized technique is also undesirable from other standpoints. For example, the effluent gas from the vessel contains some unreacted hydrogen or other reducing gas and accordingly it is desirably recycled to the reduction vessel with fresh make-up reducing gas. In the course of this recycling step, however, water vapor must be condensed and separated from the effluent gas. If fines are present to any appreciable extent in such gas, the cooling surfaces of the heat exchangers used to condense the moisture are rapidly coated with the fines and rendered inoperable within a short time. Furthermore, the presence of fines in the aforesaid effluent gas is objectionable since they cause scoring in the cylinders of the compressors used to compress fresh reducing gas and recycle gas to the desired pressure, after the condensation step.

Thus, from the problems indicated above, it is apparent that serious limitations and drawbacks have existed in the art of fluidized reduction of metal oxidic ores containing an excessive concentration of fines.

Accordingly, it is an object of my invention to provide a method for handling masses of particulate fluidized solids containing appreciable quantities of fines under conditions such that substantially no overhead loss thereof into the effluent gas stream occurs. Another object of my invention is to provide a method for handling ore charges containing appreciable quantities of fines under conditions such that substantially no overhead loss thereof into the reduction vessel effluent occurs. It is another object of my invention to process an ore charge containing substantial quantities of fines, reducing such charge in the form of a fluidized bed and recovering a gaseous effluent from the reduction step, substantially free of fines, without the use of separate filtering equipment. Another object of my invention is to provide a method for the fluidized reduction of oxidic ores whereby the fines in the charge are eventually reduced and recovered as the free metal, instead of being lost, as is the case with procedures employing filters or oil scrubbing systems. In such procedures not only is the metal lost, but valuable hydrogen or other reducing gas used to reduce the oxide to the free metal is consumed to no advantage.

While, as previously indicated, one aspect of my invention is related to a wide variety of oxidic ores, the description which follows is directed specifically to the application of my invention to the fluidized reduction of iron oxides.

Briefly my invention comprises first crushing the ore to a readily fluidizable size which may range from about 325 mesh up to particles of about ¼-inch in diameter. In the crushing operation, however, particles smaller than 325 mesh are produced. With some ores the amount of fines thus produced may be substantial. The crushed ore is screened so that particles smaller than about 200 mesh pass through and are conducted to the main reduction step as hereinafter described in detail. The coarser ore particles are fed to the top tray of a sieve plate or similar column having a plurality of trays. As will be seen, this column serves as an ore preheater as well as a means for separating fines from the reduction vessel effluent gas. The ore thus fed to the top of the column passes downwardly until it reaches the bottom tray. While the ore is moved downwardly through the column in this manner, it is counter-currently contacted with hot gases from the reduction step. The sensible heat in these gases brings the temperature of the descending ore particles on the bottom of the tray up to about 700° to about 900° F. At this temperature these particles, together with the previously separated finer material, having a particle size of about 200 mesh or less, are introduced into the reduction vessel which may be operated at a temperature of from about 700° to about 1,000° F. This mixture of fines and coarser particles is maintained in a fluidized state by the introduction of a stream of hot gas (usually about 100° F. higher than the fluid bed temperature) at a linear velocity which may range from about 0.5 to about 2 feet per second. The reduction vessel is operated generally at a pressure of from about 150 to about 400 p. s. i. Reduced metal is recovered from the base of the unit and any fines that may come overhead from the vessel are introduced at the base of the preheat column along with the hot reduction vessel effluent used for the preheating step. As the hot gaseous effluent from the reduction vessel passes upwardly through the multiple fluidized beds maintained in the column, thereby heating the descending coarser particles of freshly charged ore, the fines present in the effluent gas are trapped out and separated therefrom. In this manner the fines eventually find their way back to the reduction vessel, are reduced and withdrawn from the base of said vessel with the coarser material in the form of the free metal. Simultaneously a gaseous effluent is withdrawn from the top of the separator and preheater column substantially free from fines.

For a better understanding of my invention, reference is made to the flow diagram appearing in the accompanying drawing wherein iron ore analyzing from about 55 to about 75 percent iron is introduced through line 2 into a suitable grinding mill such as, for example, a conical ball mill 4, and ground to a particle size ranging from less than 325 mesh to about 8 to 15 mesh. Approximately 15 to 20 percent of the ground ore is smaller than 325 mesh. The ground material is then sent to conveyer 6, through line 8 and dumped onto vibratory screen 10 where particles coarser than about 325 mesh are directed into coarse feeder line 12, while the fines coming through screen 10 flow into line 14. The ore in line 12 is conducted into column 16, typically 30 feet high and 16.5 feet I. D. and on to perforated plate or grid 18. The ore is introduced into column 16 at the level of grid 18 at the rate of about 30 tons per hour. The temperature at this particular level of the column is about 830° F. The temperature throughout the column may range from about 875° to about 825° F. with pressures varying from about 240 to about 225 p. s. i. The ore on grid 18 is countercurrently contacted by hot gas flowing through the column at a linear velocity of about .95 ft./second. Relatively little fines are present in the fluid bed A. However, most of the fines present at this stage of the process are removed by means of cyclone separator 20 as the gas passes out of column 16 via line 22 at the rate of 13,000 mols per hour, carrying with it less than about 5 lbs. per hour of fines smaller than 325 mesh. This hot gas (at 825° F.) then passes through cooler 24 and is reduced in temperature to about 100° F. The condensed water and uncondensed gases are then conducted into separator 26 where water is removed from the system through line 28 and a portion of the uncondensed gas purged through line 30 in order to prevent a build-up in the system of objectionable gases such as nitrogen or methane. The remaining gas is taken from separator 26 through line 32, combined with additional hydrogen supplied through make-up line 34 and sent to compressor 36 where it is recompressed to a pressure of the order of about 260 p. s. i. The compressed gas is then taken via line 38 to heater 40 where it is preheated to about 1,000° F., transferred through line 42 and charged to reduction vessel 44 at a rate of about 13,000 mols per hour, having a hydrogen purity of about 75 mol percent.

Referring again to column 16, the ore fed into fluid bed A travels downwardly through passageway 45, formed by the walls of the column and downcomer 46 and into the fluid bed B at the base of which is grid 48. The bulk of the fines that have passed upwardly from bed B to bed A are trapped among the larger particles of fluid bed A and are carried from this bed with the larger particles flowing down passageway 45. Both the temperature and pressure are slightly higher in bed B than in bed A, the pressure being about 235 p. s. i. and the temperature being about 860° F. At the linear velocity employed, fines pass from bed B into bed A at the rate of about 230 lbs./hour. From bed B the hot ore, both coarse and fine particles, passes via a second passageway 50 formed by downcomer 52 and a portion of the wall of column 16 into bed C, maintained at a pressure of about 240 p. s. i. and at a temperature of about 880° F. The hot gas flowing upwardly through bed C has a linear velocity of about .95 ft./second. This gas comes from reduction vessel 44 via line 56, as will be described in greater detail below. With this gas a substantial amount of fines are lost overhead from vessel 44. Typically, with charge streams of the size discussed herein, the quantity of fines flowing through line 56 amounts to about 1,730 lbs./hour. As a result, bed C contains the highest concentration of fines of the fluid beds in column 16. Fines pass from bed C into bed B at a rate of about 760 lbs./hour. The contents of bed C at a temperature of about 880° F. are continuously withdrawn from column 16 through line 54, combined with fines in line 14 which are fed into line 54 at a rate of about 5 tons/hour, and the total charge in line 54 introduced into reduction vessel 44, which is typically 16.5 feet I. D. and 50 feet high, at the rate of about 35 tons/hour. The conditions under which vessel 44 is operated are as follows:

Linear velocity_____ 1 ft./second.
Temperature_____ 900° F.
Pressure_____ 250 p. s. i.

Within vessel 44, reduction of the ore is completed. Gaseous effluent is taken from the mixture via cyclone separator 58 and line 56. Reduced metal is withdrawn from the system through line 60 at the rate of about 665 tons/day.

Gas velocities through the beds in column 16 may be varied, of course, as desired, merely by altering the temperature in the particular zone concerned. Variation and control of temperature in the beds can be accomplished by use of heat exchange tubes in the beds or by other well-known methods. While the drawing discussed shows the preheater and separator column 16 to have three beds, this number may be increased or decreased depending upon the amount of fines carryover from bed A that can be tolerated and the efficiency with which the multiple beds function as filters for the fines in the system. It will likewise be apparent that the process of my invention may be carried out by placing the reduction vessel and the preheater and separator column within a single shell to make an integral unit.

In the case of oxides other than iron, it will be apparent to those skilled in the art that different operating temperatures will be applicable from those taught herein with respect to iron. This may also necessitate different flow rates of reducing gas. However, with the basic principle of my invention having been specifically set forth above, the modifications that should be made in order to adapt my invention to refining metals other than iron, will be apparent.

Although specific conditions used in conducting fluidized operations in accordance with my invention have been disclosed herein, it is to be strictly understood that such conditions are in no way considered to be a part of my invention. Actually, the principles of my invention will be found applicable under any conditions capable of creating and maintaining a fluidized bed in a reaction zone.

In general, it may be said that my invention is applicable to processes which either involve gas phase reactions in the presence of a fluidized catalyst or which involve reaction of a gas with suspended non-catalytic solids in a fluidized bed. In either case the problem of preventing loss of the more finely divided particles used in the process is the same. Thus, in the application of my invention to catalytic cracking, the composite catalyst containing both large and small sized particles is first screened to obtain separate fine and coarse fractions. The latter fraction is then introduced into a reactor such as column 16 of the drawing and countercurrently contacted with a gaseous effluent from a second reactor such as the one designated in the aforesaid drawing as vessel 44. Catalyst is continuously removed from the lower part of column 16 and combined with the fines fraction obtained in the aforesaid screening operation. This mixture of fines and coarse catalyst is then charged to vessel 44 and contacts fresh feed added at the base of vessel 44. The effluent from the latter, which contains fine catalyst particles, is returned to the base of the first reactor where fines present in said effluent are trapped out or separated by passage of said effluent upwardly through the fluidized beds in the first reactor. Effluent from the first reactor may then be processed in accordance with methods now well known to the art. In this manner catalyst fines are maintained entirely within the reactor system without the use of auxiliary filtering equipment. Catalyst is periodically or continuously withdrawn from the cracking vessel, regenerated in a known manner, screened and the resulting fine and coarse fractions handled in accordance with my invention. In order to prevent an objectionable build-up of fines, a portion thereof from the screening operation are purged from the system.

I claim:
1. In a process for contacting a gaseous stream with a bed of fluidized particles of non-uniform size in a reaction zone wherein excessive loss occurs of the more finely divided particles in said bed by entrainment of said finely divided particles with the effluent gas from said zone, the improvement which comprises first separating said particles of non-uniform size into a coarse and a fines fraction, introducing said coarse fraction into a first zone having a fluidized bed containing said particles, allowing said particles in said bed to pass downwardly through said zone, withdrawing said particles from the base of said zone and mixing them with said fines fraction, charging the resulting mixture of said particles and fines fraction into a second zone having a fluidized bed of said coarse particles and fines fraction, introducing a reactive gas stream into the base of said second zone at a velocity sufficient to fluidize said resulting mixture of said coarse particles and fines fraction whereby a transformation occurs in said last-mentioned mixture, withdrawing the resulting transformed mixture from said second zone, taking overhead from said second zone a gaseous effluent containing fines and introducing said effluent from said second zone into the base of said first zone at a velocity sufficient to fluidize said particles therein whereby said fines are separated from said effluent by the filtering action of said fluidized bed in said first zone.

2. In a continuous process for the reduction of non-uniform-sized metal oxide particles of the iron group, the improvement which comprises first separating said particles to obtain a coarse and a fines fraction, adding the resulting coarse fraction of said particles to a first zone having a plurality of separate fluidized beds of said particles, allowing said particles in said beds to pass downwardly through said first zone, withdrawing said particles from the base of said first zone and mixing them with said fines fraction, charging the resulting mixture of said particles and fines into the base of a second zone having a single fluidized bed of said particles and fines, introducing a reducing gas into the base of said second zone under reducing conditions at a velocity sufficient to fluidize said particles and fines, taking overhead from said second zone a gaseous effluent containing fines, withdrawing reduced metal from said second zone and introducing said effluent from said second zone into the base of said first zone whereby said fines are separated from said effluent by the filtering action of said fluidized beds in said first zone.

3. A continuous process for the reduction of metal oxides of the iron group which comprises introducing a metal oxide-reducing gas into a reduction zone and contacting said gas under reducing conditions with a mass of finely divided oxide of said metal under conditions such that a fluidized bed of said metal and metal oxide is formed and maintained, withdrawing from said zone hot effluent gas containing a quantity of extremely finely divided material consisting essentially of said metal and metal oxide, thereafter introducing said hot effluent gas into a second zone containing a plurality of separate fluidized beds of said metal oxide, passing said effluent gas successively through each of said beds, withdrawing from said second zone a second gaseous effluent substantially free of said finely divided material, removing a portion of the components from said second gaseous effluent other than those materials which are reducing with respect to said metal oxide, and thereafter returning said gas from which said components have been removed to said reduction zone.

4. The process of claim 2 in which the metal oxide employed is an iron oxide.

5. The process of claim 2 in which the metal oxide employed is an iron oxide and the reducing gas consists essentially of hydrogen.

6. The process of claim 3 in which the metal oxide employed is an iron oxide and the reducing gas consists essentially of hydrogen.

References Cited in the file of this patent

UNITED STATES PATENTS

| 2,132,149 | Edwin | Oct. 4, 1938 |
| 2,689,973 | Lee | Sept. 28, 1954 |
| 2,774,661 | White | Dec. 18, 1956 |
| 2,799,558 | Smith | July 16, 1957 |

FOREIGN PATENTS

| 165,726 | Australia | Oct. 21, 1955 |